US011465682B2

(12) United States Patent
Walentowski

(10) Patent No.: US 11,465,682 B2
(45) Date of Patent: Oct. 11, 2022

(54) SENSOR UNIT, STEERING WHEEL SUBASSEMBLY, RACK SUBASSEMBLY AND STEERING SYSTEM

(71) Applicant: ZF Automotive Germany GmbH, Alfdorf (DE)

(72) Inventor: Stephan Walentowski, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 421 days.

(21) Appl. No.: 16/746,783

(22) Filed: Jan. 17, 2020

(65) Prior Publication Data

US 2020/0231209 A1 Jul. 23, 2020

(30) Foreign Application Priority Data

Jan. 23, 2019 (DE) .......................... 102019101614.2

(51) Int. Cl.
*G01L 5/22* (2006.01)
*B62D 15/02* (2006.01)
*B62D 5/04* (2006.01)
*B62D 1/184* (2006.01)

(52) U.S. Cl.
CPC ......... *B62D 15/0225* (2013.01); *B62D 1/184* (2013.01); *B62D 5/049* (2013.01); *B62D 15/0245* (2013.01); *G01L 5/221* (2013.01)

(58) Field of Classification Search
CPC .... B62D 15/0225; B62D 1/184; B62D 5/049; B62D 15/0245; B62D 5/005; B62D 5/0481; B62D 15/0215; B62D 1/04; B62D 3/126; B62D 15/024; G01L 5/221
See application file for complete search history.

(56) References Cited

U.S. PATENT DOCUMENTS

| 4,366,768 | A | 1/1983 | Kulischenko et al. |
| 6,488,115 | B1 * | 12/2002 | Ozsoylu ............... B62D 5/0427 180/402 |
| 7,628,244 | B2 * | 12/2009 | Chino ..................... F16C 1/262 180/444 |
| 10,780,915 | B2 * | 9/2020 | Rakouth ................ B62D 1/286 |
| 11,046,354 | B2 * | 6/2021 | Klinger .................. B62D 5/005 |
| 2003/0089166 | A1 | 5/2003 | Mizuno et al. |
| 2017/0158227 | A1 | 6/2017 | Katzourakis et al. |
| 2017/0341681 | A1 * | 11/2017 | Shiino ................... B62D 5/046 |
| 2018/0154932 | A1 * | 6/2018 | Rakouth ................ B62D 1/283 |

(Continued)

FOREIGN PATENT DOCUMENTS

| CN | 102039932 A | 5/2011 |
| DE | 3703591 A1 | 8/1988 |

(Continued)

*Primary Examiner* — Freddie Kirkland, III
(74) *Attorney, Agent, or Firm* — Robert James Harwood

(57) ABSTRACT

A sensor unit for a steering system, in particular a steer-by-wire steering system, includes a component to be monitored and having a multifunctional position sensor, which has at least one spring element and at least one piezoelectric sensor, which is associated with the spring element and is provided at a first end of the spring element. The spring element is associated with the component to be monitored via a second end opposite to the first end. A steering wheel subassembly, a rack subassembly and a steering system are furthermore described.

20 Claims, 3 Drawing Sheets

(56) References Cited

U.S. PATENT DOCUMENTS

2018/0244304 A1\* 8/2018 Sakamaki ............ B62D 5/0433
2019/0283796 A1\* 9/2019 Rawlings ................. B62D 1/10
2020/0189649 A1\* 6/2020 Polmans ................ B62D 5/005

FOREIGN PATENT DOCUMENTS

DE          3814845 A1   11/1989
DE     102015206711 A1   10/2016

\* cited by examiner

A - A

US 11,465,682 B2

SENSOR UNIT, STEERING WHEEL SUBASSEMBLY, RACK SUBASSEMBLY AND STEERING SYSTEM

CROSS-REFERENCE TO RELATED APPLICATIONS

This application claims priority to German Patent Application DE102019101614.2, filed Jan. 23, 2019, the disclosure of which is incorporated herein by reference in its entirety.

TECHNICAL FIELD

The present disclosure relates to a sensor unit for a steering system, in particular a steer-by-wire steering system. The present disclosure furthermore relates to a steering wheel subassembly, a rack subassembly and a steering system.

BACKGROUND

Modern motor vehicles have various functions which, inter alia, require information relating to the current steering anode or the current steering position. The steering angle or the steering position may be that of the steering wheel and/or that of the front axle, e.g. of the rack. It is therefore important in general to be able to determine the steering angle or steering positions with a high degree of integrity, i.e. reliably and correctly.

Normally, these motor vehicles comprise electromechanical servo steering systems, which have corresponding electric motors and actuators, with each of which a motor position sensor is associated, via which at least the relative position can be detected in automated fashion, i.e. the position relative to a zero position when starting. Owing to the required high degree of integrity, a second sensor is therefore necessary, however, in order to be able to detect the absolute position reliably and correctly, at least in the zero position when starting. For this purpose, use is usually made of an absolute position sensor, thereby giving rise to additional costs in the steering system.

In conventional steering systems, the steering wheel is coupled mechanically to the wheels, and it is therefore sufficient to detect the absolute position of one component of the steering system since the position of the other component can be determined on the basis of the geometrical relations in the steering system. For example, the position of the steering wheel is determined on the basis of the detected absolute position of the wheels or of the front axle connected to the wheels, in particular of the rack. However, this is not possible with "steer-by-wire" steering systems since the steering wheel and the wheels are no longer (necessarily) coupled mechanically.

In steering systems of this kind, there are two actuators, however. On the one hand, a front axle actuator is provided, said actuator controlling the position of the front axle or of the rack and measuring it accordingly, i.e. controlling and measuring the steering angle or steering position of the wheels. On the other hand, a steering wheel actuator is provided, which measures and controls the angular position of the steering wheel. The steering wheel actuator can measure the angular position of the steering wheel in order to measure an angle set by the driver in the manual driving mode, to obtain input information, e.g. for automatic return or centering of the steering, and/or for angular control in the (partially) automated driving mode. Since the steering wheel and the wheels can be moved independently of each other or are no longer coupled to one another mechanically, the positions of both components of the steering system must be detected in order to ensure the desired high degree of integrity. However, this gives rise to even higher costs since two absolute position sensors are provided, resulting in a further increase in the overall costs of the steering system.

SUMMARY

It is the object of the present disclosure to make available a steering system with which it is possible, inter alia, to detect the absolute position in a simple and low-cost manner. According to the present disclosure, the object is achieved by a sensor unit for a steering system, in particular a steer-by-wire steering system, having a component to be monitored and having a multifunctional position sensor, which has at least one spring element and at least one piezoelectric sensor, which is associated with the spring element and is provided at a first end of the spring element. The spring element is associated with the component to be monitored via a second end opposite to the first end.

The basic concept of the present disclosure is to make available a novel sensor unit which can detect the steering angle/position of the steering system, in particular the steering angle or steering position of one component of the steering system, namely the steering angle or steering position of the steering system component to be monitored, in a force- or torque-based manner. In general, the sensor unit can be provided on different components of the steering system, corresponding to different locations of use. Depending on the location of use of the sensor unit, this can be the steering angle or steering position at the steering wheel or the steering angle or steering position of the wheels, this being detected in a corresponding (indirect) manner by the sensor unit.

In principle, the position of the component to be monitored, in particular the position change, is converted into a force or a change in force, which acts on the piezoelectric sensor of the sensor unit, e.g. via the spring element. The correspondingly converted force is then measured by means of the at least one piezoelectric sensor of the multifunctional position sensor in order to infer the position of the component to be monitored from the basis of the force acting on the piezoelectric sensor. It is thereby possible to determine an absolute position of the component to be monitored with the required high degree of integrity. If the sensor unit is provided in a steering wheel subassembly, the steering angle or steering position of the steering wheel can therefore be detected (indirectly) via the piezoelectric sensor in that the steering angle or steering position is converted into an associated force, which is detected by the piezoelectric sensor.

If the sensor unit is provided in a rack subassembly, the steering angle or steering position of the wheels coupled to the rack can therefore be detected (indirectly) via the piezoelectric sensor in that the steering angle or steering position is converted into an associated force, which is detected by the piezoelectric sensor. In general, the piezoelectric sensor is designed to convert a pressure applied to a measuring surface of the piezoelectric sensor, which is dependent on the converted force, into a corresponding voltage signal. The steering angle or steering position of the component to be monitored can then be detected in absolute terms via the corresponding voltage signal.

For this purpose, a plate can be provided at the first end of the at least one spring element, said plate distributing the force introduced via the spring element over an extended area of the piezoelectric sensor. Via the plate, a uniform force can act on or be introduced into the piezoelectric sensor, thus avoiding voltage peaks that could lead to incorrect measurement or even to damage to the piezoelectric sensor. In general, the force can thus be converted into a distributed pressure acting on the piezoelectric sensor.

One aspect envisages that a transmission arrangement is provided, which is associated with the at least one spring element, wherein the transmission arrangement is provided between the component to be monitored and the associated spring element. By means of the transmission arrangement, a minimum resolution and/or accuracy to be achieved can be established. For example, relatively long movement distances and springs that have a relatively low spring stiffness are provided. It is thereby possible to reduce the effect of installation tolerances on measurement.

Another aspect envisages that the multifunctional position sensor comprises two spring elements and two piezoelectric sensors, which are each associated with one spring element, in particular wherein the two spring elements are each preloaded. For the two spring elements and the two piezoelectric sensors, which are each associated with one spring element, it is thus possible to create a redundancy of the sensor unit, and it is therefore still possible, by means of the sensor unit, to measure a force via which it is possible to infer the position of the component to be monitored, if one spring element or one piezoelectric sensor fails.

The two spring elements can be arranged and preloaded in such a way that there is continuous contact with at least one piezoelectric sensor or that the two spring elements always have a certain preload, even if the component to be monitored is deflected to the maximum extent. To this extent, the contact with the piezoelectric sensors cannot fail since the corresponding spring elements always press against at least one piezoelectric sensor. This is due, inter alia, to the preload and to the arrangement of the spring elements, and therefore no operating situation during which no force can be measured by means of a piezoelectric sensor occurs during measurement.

Moreover, it is thereby possible to ensure that the spring elements are not overextended, which would lead to a change in the spring characteristic. This too depends once again on the preload and the arrangement of the spring elements. Moreover, the two piezoelectric sensors can be used to carry out a check on the integrity of the sensor unit itself since both piezoelectric sensors output a signal. The two signals output by the piezoelectric sensors can then be set in relation to one another in order to check the functioning of the sensor unit.

As an alternative, it is also possible for the sensor unit to have just one spring element and one piezoelectric sensor, wherein the spring element can be subject to substantially no load in a neutral position of the component to be monitored. Depending on the direction of rotation of the component to monitored, there is then compression or extension of the spring element, which the piezoelectric sensor detects accordingly since there is a change in the force due to the compression or tension force associated with the compression or extension.

A further aspect envisages that the spring element is associated indirectly via the second end thereof with the component to be monitored since a force transfer device is arranged in between. The force transfer device can have at least one force transfer element, e.g. a fiber, a cable and/or a wire, via which the force transfer device is coupled to the component to be monitored. The component to be monitored, the position of which is changed during the actuation of the steering system, thus interacts at least indirectly with the force transfer device, which in turn interacts with the spring element, with the result that a change in the position of the component to be monitored is transmitted by the spring element to the associated piezoelectric sensor. The force transfer element, e.g. the fiber, the cable and/or the wire, can be coupled in a simple manner to the component to be monitored. The force transfer element is wound at least partially around the component to be monitored, for example.

In particular, the rotary motion of the steering system component to be monitored is converted into a translational motion of the force transfer element, thereby enabling a force or a pressure connected with the change in the position of the component to be monitored to be measured in a simple manner.

Moreover, the force transfer device can comprise at least one moving member, in particular a plate-shaped moving member, which is designed to move when the component to be monitored is actuated. The movement of the at least one moving member can be a pushing or pulling movement, wherein this depends on the direction of motion of the component to be monitored, for example. For example, two moving members are provided, which are each associated with one spring element and/or one piezoelectric sensor.

According to one embodiment, the two spring elements rest directly against the moving member via the respective second ends, in particular on opposite sides of the moving member. Accordingly, the moving member can be arranged between the two spring elements, and therefore a movement of the moving member results in compression of the first spring element and extension of the second spring element.

As an alternative, both spring elements can be arranged on one side of two separately formed moving members. In a neutral position, the sides of the two moving members can lie in a common plane. In other words, the sides of the two moving members face a common component of the sensor unit.

The spring element can rest directly, by means of its second end, against the component to be monitored, in particular against a contact surface provided on a projection of the component to be monitored. This results in direct coupling of the spring element to the component to be monitored. The component to be monitored can have a correspondingly predefined contact surface, which is arranged on a projection or some other region projecting from the component to be monitored, for example. As an alternative, the spring element can be arranged on a component coupled for conjoint rotation or conjoint movement with the component to be monitored, thus ensuring that the movement of the component to be monitored is transmitted to the spring element via the corresponding component.

Moreover, a moisture and/or water penetration sensor can be provided. Particularly in the case of steer-by-wire steering systems which comprise electronic components, it is important that these should not be damaged by moisture or water ingress. This can be monitored by the sensor unit. For example, the at least one piezoelectric sensor can be designed as a transmitter, which is activated in such a way that ultrasonic pulses are emitted and reflected and are received by the piezoelectric sensor. Here, wave propagation depends on the density of the environment, thereby allowing a corresponding inference as to water ingress. Since the ultrasonic pulses are high-frequency and do not have a high amplitude, the position measurements are not disrupted by the ultrasonic pulses. This is due inter glia to the fact that the amplitudes are orders of magnitude smaller than the position changes of the component to be monitored which are to be resolved and that the frequencies lie within a completely different frequency range, ensuring that there are no interferences or superpositions here which could have an effect on position measurement.

For early detection of water ingress, the piezoelectric sensor is preferably arranged at a relatively low point in a housing of the sensor unit, in which the water would collect first. If two piezoelectric sensors are provided, one piezoelectric sensor can serve as a transmitter and another piezoelectric sensor can serve as a receiver for the ultrasonic pulses.

According to the present disclosure, the object is furthermore achieved by a steering wheel subassembly, having a steering wheel, a steering shaft and a sensor unit of the abovementioned type designed as a steering wheel sensor, wherein the steering shaft is the component to be monitored. Thus, the sensor unit detects a rotary motion of the steering shaft, which is converted in corresponding fashion into a translational motion, and therefore a force acting on the piezoelectric sensor or an applied pressure is measured in order to infer a change in the position of the component to be monitored. The change in the position of the component to be monitored can accordingly be a steering angle applied to the steering shaft, which results in a corresponding steering position of the component to be monitored. The abovementioned advantages of the sensor unit are obtained in analogous fashion for the steering wheel subassembly.

It is possible to provide a steering wheel actuator that comprises a motor position sensor. The motor position sensor can automatically detect the relative position of the steering shaft via the position of the steering wheel actuator. By this means, fine measurement of the position of the component to be monitored, i.e. of the steering shaft, is generally possible. The relative position can be detected by means of the motor position sensor, whereby it is possible, in conjunction with the absolute position, detected by the sensor unit, of the component to be monitored, to determine a very accurate absolute position.

The accuracy and resolution of the sensor unit depends inter alia on the transmission arrangement between the steering wheel actuator and the steering wheel or steering shaft if the absolute position is to be determined with the required high degree of integrity. For example, the accuracy and resolution of the sensor unit at a transmission ratio between the steering wheel or steering shaft and the steering wheel actuator of 1:3 must be better than +/−60°, i.e. must correspond to one third of a full revolution of the steering wheel or steering shaft (transmission ratio (1:3)× 360°=120°=+/−60°). At an illustrative transmission ratio of 1:4, a minimum accuracy or resolution of +/−45° is obtained.

Via the sensor unit, it is accordingly possible to determine the rotation of the steering wheel actuator, i.e. what multiple of a full rotation has been performed, wherein the specific position with the corresponding rotation can then be determined via the motor position sensor by means of the relative position measurement. It is thereby possible to determine the absolute position with corresponding accuracy. If the sensor unit is coupled directly to the steering wheel actuator, a minimum accuracy or resolution of +/−180° is sufficient.

A further aspect envisages that, inter alia by virtue of the sensor unit, the steering wheel subassembly comprises a redundant absolute position detection unit. Accordingly, the sensor unit can be used in addition to the motor position sensor. In principle, the accuracy or resolution of the sensor unit should be better than a functional safety limit in order to allow position measurement on the basis of the sensor unit only when the motor position sensor has failed, thus ensuring an appropriate fallback level (redundancy). Moreover, it is possible in this way to carry out continuous validation of the motor position sensor in normal operation, thus creating a redundancy. In other words, it is possible to use a second source, namely the sensor unit, to decide whether position detection on the basis of the motor position sensor is at least still within the functional safety limit. The position sensor has a further function.

A further aspect envisages that, by virtue of the sensor group, the steering wheel subassembly has a failure feedback unit, which outputs a haptic feedback to the steering wheel in the case of failure of the steering wheel actuator. The corresponding failure feedback unit can be set via the spring characteristic of the at least one spring element of the sensor unit. Thus, the sensor unit acts via the at least one spring element on the component to be monitored, with the result that a force emanating from the sensor unit is exerted on the component to be monitored if no external force is exerted on the steering wheel subassembly, e.g. owing to steering movements by the vehicle driver. The position sensor consequently has a further function.

Moreover, the steering wheel subassembly can comprise a self centering unit for the steering wheel by virtue of the sensor unit. The self centering unit can likewise be made available by means of the sensor unit, in particular the at least one spring element. Accordingly, the sensor unit can be designed in such a way that, in its neutral position, the spring element ensures that the steering wheel is transferred into the neutral position thereof if the steering wheel actuator fails. Thus, a mechanical self centering unit is provided by virtue of the sensor unit, in particular the at least one spring element. This is important particularly in the case of steer-by-wire systems since the mechanical self centering based on the steering system is no longer available as there is no mechanical connection with the wheels. The position sensor accordingly has a further function.

Moreover, the steering subassembly can comprise a rotational direction lock by virtue, inter alia, of the sensor unit, in particular wherein a radial extension, which is part of the rotational direction lock, is formed on the steering shaft. The sensor unit, which comprises a corresponding moving member, can be designed in such a way that it interacts with a radial extension provided on the steering shaft if the component to be monitored, i.e. the steering shaft, has been adjusted into a certain position, e.g. a maximum rotation of the steering shaft has been reached. In this state, the moving member engages via a peg in a radial extension of the steering shaft in order to lock the steering wheel in the corresponding direction of rotation as soon as a predefined rotation in the direction of rotation has already taken place. The position sensor accordingly includes a further function.

However, reverse rotation in the other direction of rotation is possible, and therefore the rotational direction lock represents a kind of stop in the respective direction of rotation since onward rotation in the corresponding direction of rotation is thereby prevented if the predefined rotation in the direction of rotation has already occurred.

In general, provision can be made here for the rotational direction lock to allow a rotation of the steering wheel by +/−540°, for example, i.e. three full revolutions from end position to end position of the respective direction of rotation. Furthermore, the rotational direction lock, in particular the peg and/or the radial extension, should be designed in such a way that a significant torque can be withstood, e.g. a torque of at least 100 Nm.

At the same time, the average power consumption of the steering wheel actuator in the steering subassembly can be lowered by virtue of the sensor unit. The sensor unit simultaneously forms an energy-saving module of the steering subassembly. Normally, the steering wheel actuator must exert a torque continuously on the steering wheel in order to actively return the steering wheel to the neutral position after a steering movement since, in the steer-by-wire steering system, the mechanical coupling between the steering wheel and the front axle, which brings about a return of the steering wheel in a conventional steering system, is not available. Likewise, the steering wheel actuator normally produces a force or torque counter to the steering movement during steering in order, inter alia, to simulate the feedback of the road, which is not available in the steer-by-wire steering system owing to the lack of mechanical coupling to the front axle. These forces or torques can now be made available in part by the sensor unit, thereby ensuring that the average power consumption of the steering wheel actuator is lower. The position sensor accordingly has a further function.

Moreover, the sensor unit in the steering subassembly can be provided for the purpose of measuring a torque of the steering subassembly, e.g. a torque applied by the steering wheel actuator and/or a manual torque on the steering wheel, which is introduced by the vehicle driver. The sensor unit can thus be provided as a third source of verification in the steering subassembly, in addition to the steering wheel actuator and a torque sensor. This represents a further function of the position sensor.

According to the present disclosure, the object is furthermore achieved by a rack subassembly, having a rack and a sensor unit of the abovementioned type designed as a rack sensor, wherein the rack is the component to be monitored. Thus, the sensor unit can be used to detect a movement or change in the position of the rack, wherein the movement of the component to be monitored is likewise converted into a force, which is detected by the piezoelectric sensor, as has already been explained above using the example of the steering shaft. The change in the position of the component to be monitored can accordingly be a translational adjustment of the rack, which results in a corresponding steering position of the component to be monitored, in particular of the wheels coupled to the rack, which accordingly adopt a steering angle or a steering position.

The abovementioned advantages of the sensor unit are obtained in analogous fashion for the rack subassembly. One aspect envisages a front axle actuator which comprises a motor position sensor. The motor position sensor can automatically detect the relative position of the steering shaft via the position of the steering wheel actuator. By this means, fine measurement of the position of the component to be monitored, i.e. of the rack, is generally possible. The relative position can be detected by means of the motor position sensor, whereby it is possible, in conjunction with the absolute position, detected by the sensor unit, of the component to be monitored, to determine a very accurate absolute position.

The accuracy and resolution of the sensor unit depends inter alia on the transmission arrangement between the front axle actuator and the rack if the absolute position is to be determined with the required high degree of integrity. The accuracy and resolution of the sensor unit at a transmission ratio between the front axle actuator and the rack of 7 mm/rotation must be better than +/−3.5 mm, for example.

Via the sensor unit, it is accordingly possible to determine the rotation of the front axle actuator, i.e. what multiple of a full rotation has been performed, wherein the specific position with the corresponding rotation can then be determined via the motor position sensor by means of the relative position measurement. It is thereby possible to determine the absolute position with corresponding accuracy.

A further aspect envisages that, by virtue, inter alia, of the sensor unit, the rack subassembly comprises a redundant absolute position detection unit. Accordingly, the sensor unit can be used in addition to the motor position sensor. In principle, the accuracy or resolution of the sensor unit should be better than a functional safety limit in order to allow position measurement on the basis of the sensor unit only when the motor position sensor has failed, thus ensuring an appropriate fallback level (redundancy). Moreover, it is possible in this way to carry out continuous validation of the motor position sensor in normal operation, thus creating a redundancy. In other words, it is possible to use a second source, namely the sensor unit, to decide whether position detection on the basis of the motor position sensor is at least still within the functional safety limit. A further function of the position sensor is thereby ensured.

Moreover, the rack subassembly can comprise a rotation lock by virtue, inter alia, of the sensor unit. The rack subassembly can be used in a steer-by-wire steering system, for example. In conventional steering systems, a rack and pinion mechanism is generally used in order to prevent twisting of the rack. Although it is possible to dispense with this rack and pinion mechanism in a steer-by-wire steering system, the rotation lock or safeguard against twisting must be achieved in some other way, however. In the present case, the corresponding rotation lock can now be provided by the sensor unit, thus making it possible to dispense with a component or subassembly of some other kind to provide the rotation lock. Thus, the sensor unit simultaneously represents a rotation lock, reducing the number of subassemblies used and thus costs. The position sensor thus has a further function.

According to the present disclosure, the object is furthermore achieved by a steering system having at least one sensor unit of the abovementioned type, a steering wheel subassembly of the abovementioned type and/or a rack subassembly of the abovementioned type. In particular, the steering system is a steer-by-wire steering system. The abovementioned advantages are obtained in analogous fashion for the steering system.

One aspect envisages that the steering system comprises at least one steering shaft and/or a rack, wherein the at least one multifunctional position sensor is associated with the steering shaft and/or the rack, in particular wherein a steering shaft and a rack are provided, with which a multifunctional position sensor is associated. It is thereby possible in a simple manner to make available a steering system which is suitable for monitoring the absolute position of the corresponding component of the steering system at low cost and by simple means, thus enabling the required high integrity to be ensured.

If the steering system is a steer-by-wire steering system, it is also possible to provide a plurality of sensor units, which detect the steering angle or steering position of the steering wheel and the steering angle or steering position of the rack or of the wheels. The position sensor of the sensor unit is multifunctional since, in addition to monitoring the components of the steering system, i.e. detecting a change in the position of the component to be monitored, it provides further functions of the steering system, as has been explained above.

BRIEF DESCRIPTION OF THE DRAWINGS

Further advantages and characteristics of the present disclosure will emerge from the following description and the drawings, to which reference is made. In the drawings.

DETAILED DESCRIPTION

Figure 1:
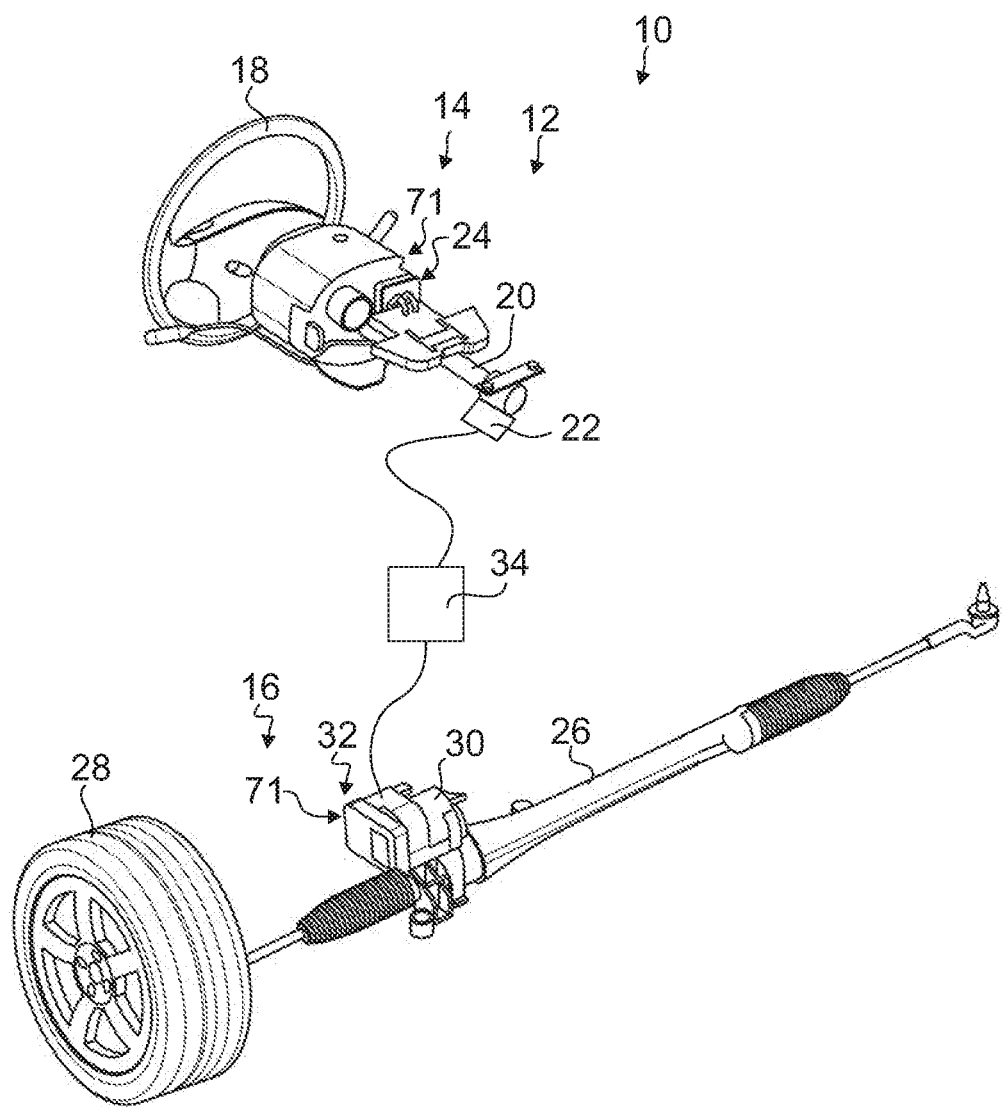
FIG. 1 shows a schematic view of a steering system according to the present disclosure, having a steering wheel subassembly according to the present disclosure and a rack subassembly according to the present disclosure.

FIG. 1 shows a steering system 10 for a motor vehicle, which, in the embodiment shown, is a steer-by-wire steering system 12. In principle, a steering system 10 has a steering wheel subassembly 14 and a rack subassembly 16, which can also be referred to as a front axle subassembly. In a steer-by-wire steering system 12, in contrast to conventional steering systems, there may be no mechanical connection provided between the steering wheel subassembly 14 and the rack subassembly 16, as is clearly apparent from FIG. 1. The steering wheel subassembly 14 typically comprises a steering wheel 18 and a steering shaft 20, which is coupled to the steering wheel 18 and with which is associated a steering wheel sensor 22, further details of which will be given below with reference to FIGS. 2 and 3.

Moreover, in the embodiment shown, the steering wheel subassembly 14 comprises a steering wheel actuator 24 which can exert a return movement on the steering wheel 18 for example, in order in this way to give the vehicle driver mechanical feedback, which is no longer available in the steer-by-wire steering system 12 owing to the lack of mechanical coupling between the steering wheel subassembly 14 and the rack subassembly 16. The (generally available mechanical) feedback from the rack subassembly 16 is accordingly simulated by means of the steering wheel actuator 24. The rack subassembly 16 typically comprises a rack 26, on which are arranged wheels 28, of which one is shown in the present case.

Moreover, in the embodiment shown, the rack subassembly 16 comprises a front axle actuator 30, by means of which a steering movement on the rack 26 can be initiated, this being transmitted to the wheels 28. Moreover, the rack subassembly 16 comprises a rack sensor 32, further details of which will be given below with reference to FIGS. 4 and 5.

To control the steering wheel actuator 24 and/or the front axle actuator 30, the steering system 10 furthermore comprises a controller 34. The controller 34 can receive and correspondingly process the sensor signals of the steering wheel sensor 22 and/or of the rack sensor 32. In principle, the steering wheel actuator 24 and/or the front axle actuator 30 can also be provided in a conventional steering system 10 in order, for example, to exert auxiliary steering torques and/or to implement (partially) autonomous driving situations, e.g. parking maneuvers or similar.

Figure 2:
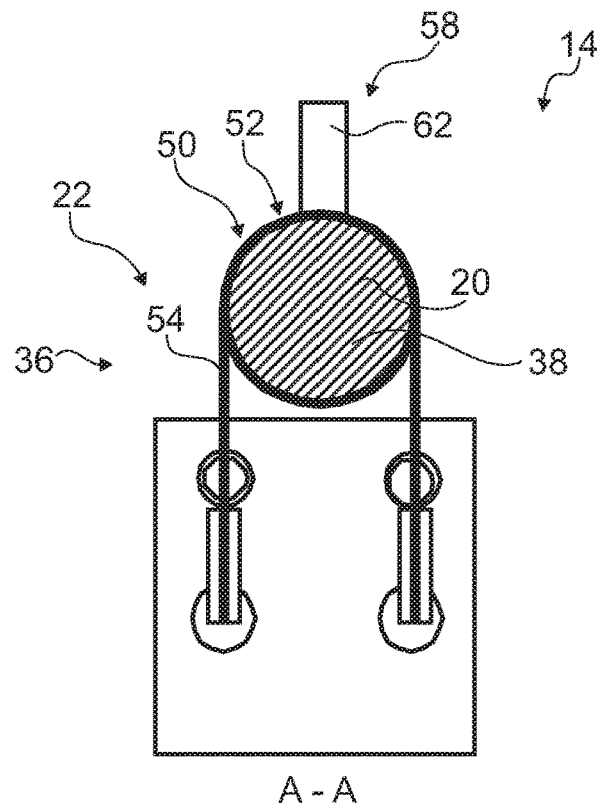
FIG. 2 shows a section through a steering wheel subassembly having a sensor unit according to the present disclosure.
Figure 3:
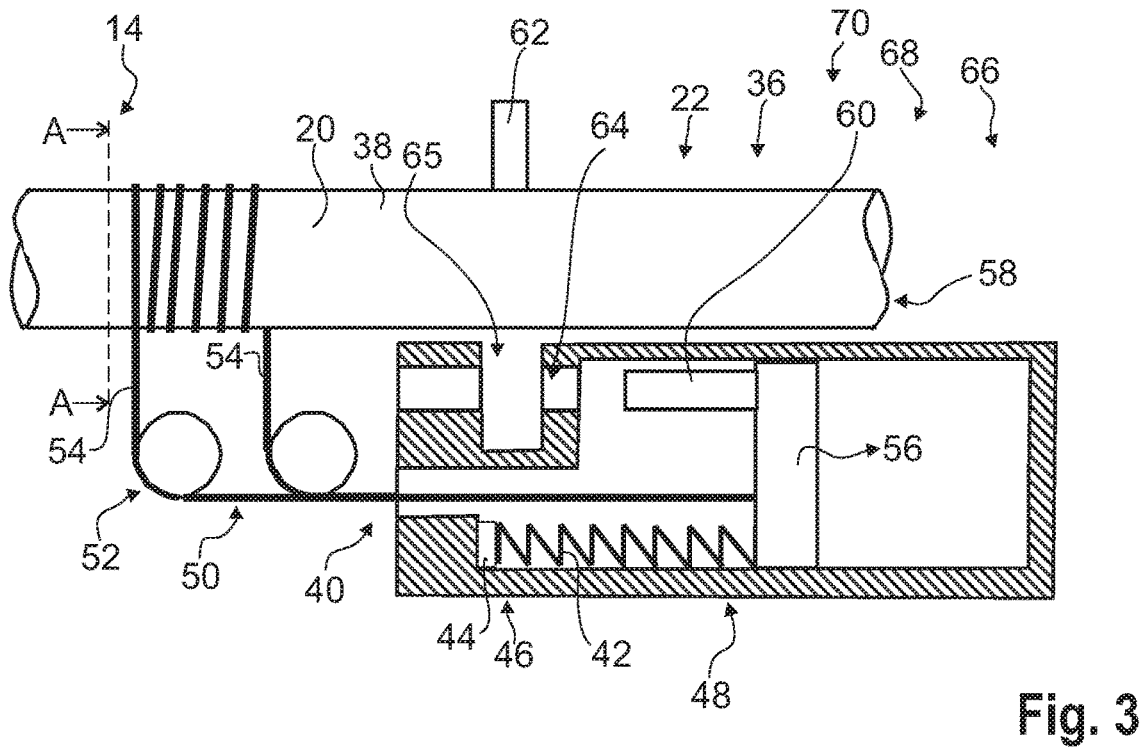
FIG. 3 shows another section through the steering wheel subassembly from FIG. 2.

In FIGS. 2 and 3, the steering wheel sensor 22 of the steering wheel subassembly 14 shown in FIG. 1 is illustrated in detail in accordance with one embodiment. The steering wheel sensor 22 is also referred to as a sensor unit 36. This is due to the fact that, in principle, the construction of the steering wheel sensor 22, i.e. of the sensor unit 36, can also be used at some other position in the steering system 10, i.e. on some other component of the steering system 10, such as the rack subassembly 16.

In principle, the sensor unit 36 or steering wheel sensor 22 is designed to perform sensor monitoring of the steering shaft 20, in particular to detect a change in the position of the steering shaft 20 which occurs owing to a rotary motion of the steering shaft 20. Thus, the steering shaft 20 is a component 38 to be monitored by the sensor unit 36. For this purpose, the sensor unit 36 or the steering wheel sensor 22 comprises a multifunctional position sensor 40 which has at least one spring element 42 and at least one piezoelectric sensor 44, which is associated with the spring element 42.

In the embodiment shown, the position sensor 40 comprises two spring elements 42 and two piezoelectric sensors 44, as can be seen particularly from FIG. 2. In FIG. 3, one spring element 42 and one piezoelectric sensor 44 conceal the other one in each case, owing to the selected sectional view in FIG. 3. The spring elements 42 are each arranged, via a first end 46, directly on the associated piezoelectric sensor 44, wherein the respective spring elements 42 comprise a second end 48, which is opposite to the first end 46. The second end 48 of the respective spring element 42 is associated with the component 38 to be monitored, i.e. the steering shaft 20.

In the embodiment shown, a transmission arrangement 50 is provided between the component 38 to be monitored and the spring element 42, said transmission arrangement comprising a force transfer device 52, which has a force transfer element 54 that is coupled to the component 38 to be monitored, as is clear from FIGS. 2 and 3. The force transfer element 54 is a fiber, which is wound around the steering shaft 20, as is apparent from FIG. 3.

The force transfer device 52 furthermore comprises two moving members 56, in particular plate-shaped moving members, which are coupled directly to the force transfer element 54, in particular to the ends thereof, and to the second ends 48 of the respective spring elements 42, as is apparent from FIG. 3. In FIG. 3, the two moving members 56 are arranged in series, for which reason one moving member 56 conceals the other moving member 56. In this case, the two spring elements 42 are each arranged on one of the two moving members 56. As a result, both spring elements 42 can be continuously preloaded, irrespective of the rotary motion of the steering wheel 18 or of the steering wheel subassembly 14, as will be explained below.

In the case of a rotary motion of the steering wheel subassembly 14, in particular of the steering shaft 20, the rotary motion is transmitted via the force transfer device 52, i.e. the force transfer element 54 and the respective moving member 56, to the spring elements 42, which undergo compression or extension as a result, depending on the direction of rotation of the steering shaft 20.

The rotation of the steering wheel subassembly 14, in whatever direction, has the effect that the steering shaft 20 actuates the force transfer element 54 in such a way that a tension force arises at one end, by means of which a first moving member 56 is pulled in the direction of the associated piezoelectric sensor 44, as a result of which the associated spring element 42 is compressed, whereas that end of the force transfer element 54 which is associated with the other moving member 56 is relaxed, with the result that the spring element 42 associated with the other moving member 56 pushes the other moving member 56 away from the associated piezoelectric sensor 44. As a result, the force applied to each of the piezoelectric sensors 44 changes, thereby enabling the change in the position of the component 38 to be monitored, i.e. the steering shaft 20, to be detected accordingly by means of the piezoelectric sensors 44. Thus, two moving members 56 are provided in the steering wheel sensor 22. The force transfer element 54, e.g. the fiber, is attached by a first end to a first of the two moving members 56 and extends to the steering shaft 20, in particular via a deflection roller.

The force transfer element 54 designed as a fiber can then be wound at least partially around the steering shaft 20. The force transfer element 54 furthermore extends, in particular, over a second deflection roller, from the steering shaft 20 to the second of the two moving members 56, to which it is attached by its second end. In other words, the force transfer element 54 has two ends, which are each arranged on an associated moving member 56, wherein the main section of the force transfer element 54 is arranged on the steering shaft 20, in particular being wound around the steering shaft 20. The two moving members 56 can move in parallel, in particular in each case in a dedicated chamber.

When the steering shaft 20 is rotated, the force transfer element 54 designed as a fiber is wound up from one direction, leading to the pulling in of one of the two moving members 56 and a corresponding compression of the spring element 42 associated with this moving member 56. On the other side, the force transfer element 54 designed as a fiber is unwound, allowing the other spring element 42 to push the other of the two moving members 56 back through its own preload. The force transfer element 54 designed as a fiber thus remains tensioned. The modified spring forces of the spring elements 42 are each detected by the piezoelectric sensors 44 associated therewith and can be converted into corresponding (steering) position information of the steering shaft 20.

In the embodiment shown, the steering wheel subassembly 14 furthermore comprises a rotational direction lock 58, whereby a rotation of the steering wheel 18 or the entire steering wheel subassembly 14 can be locked in one direction of rotation, in particular beyond a predefined rotary movement. Arranged on the moving member 56 for this purpose is a peg 60, which can interact with a radial extension 62 arranged on the steering shaft 20 if the steering wheel subassembly 14 has been adjusted or rotated by a predetermined travel.

If the steering wheel 18 of the steering wheel subassembly 14 is rotated to the maximum extent or by the predefined travel in a certain direction, the respective moving member 56 moves towards the associated piezoelectric sensor 44. Owing to the movement of the moving member 56, the peg 60 arranged on the moving member 56 extends through an opening 64 in the housing of the sensor unit 36 and interacts with the radial extension 62, which has rotated into a recess 65 associated with the opening 64. The peg 60 can then interact with the radial extension 62 in such a way that the steering wheel subassembly 14 is locked, i.e. further rotation in this direction is no longer possible. Rotation in the other direction, i.e. back again, is possible, however. The maximum or predefined travel can correspond to a rotation of the steering wheel 18 by +/−540°, for example, i.e. three full revolutions from end position to end position of the respective direction of rotation.

The value depends on what transmission ratio between the rotation of the steering shaft 20 and the translational motion of the corresponding moving member 56 has been selected and what distance the corresponding moving member 56 must travel until the associated peg 60 blocks the path of the extension 62. Furthermore, the steering wheel subassembly 14 comprises a failure feedback unit 66, a self centering unit 68 and an absolute position detection unit 70 of redundant design. The failure feedback unit 66 outputs a haptic feedback to the steering wheel 18 if the steering wheel actuator 24 has failed since a force can be transmitted to the steering shaft 20 by means of the spring characteristic of the at least one spring element 42.

This force can also be used to center the steering wheel 18 or steering wheel subassembly 14 itself, with the result that the sensor unit 36 simultaneously provides the self centering unit 68. Accordingly, the sensor unit 36 can be designed in such a way that, in its neutral position, the at least one spring element 42 ensures that the steering wheel 18 is transferred into the neutral position thereof if the steering wheel actuator 24 fails. The absolute position detection unit 70 of redundant design is formed, inter alia, by the steering wheel subassembly 14, in particular the steering wheel actuator 24, having a motor position sensor 71, which can automatically detect the relative position of the steering shaft 22 via the position of the steering wheel actuator 24. Together with the absolute position measurement by the sensor unit 36, it is thereby possible to determine a very accurate absolute position of the steering shaft 22.

The accuracy or resolution of the sensor unit 36 can be better than a functional safety limit of the steering wheel subassembly 14, thereby allowing position measurement on the basis of the sensor unit 36 if the motor position sensor 71 fails. A corresponding fallback level (redundancy) is therefore created by means of the sensor unit 36, which accordingly secures the absolute position detection unit 70 of redundant design. It is furthermore possible in this way for the measurements of the motor position sensor 71 to be monitored or verified continuously in normal operation, and therefore redundancy is also provided in normal operation. If only one spring element 42 and one piezoelectric sensor 44 is provided, the corresponding spring element 42 can be compressed or extended, depending on the direction of rotation of the steering wheel subassembly 14.

Figure 4:
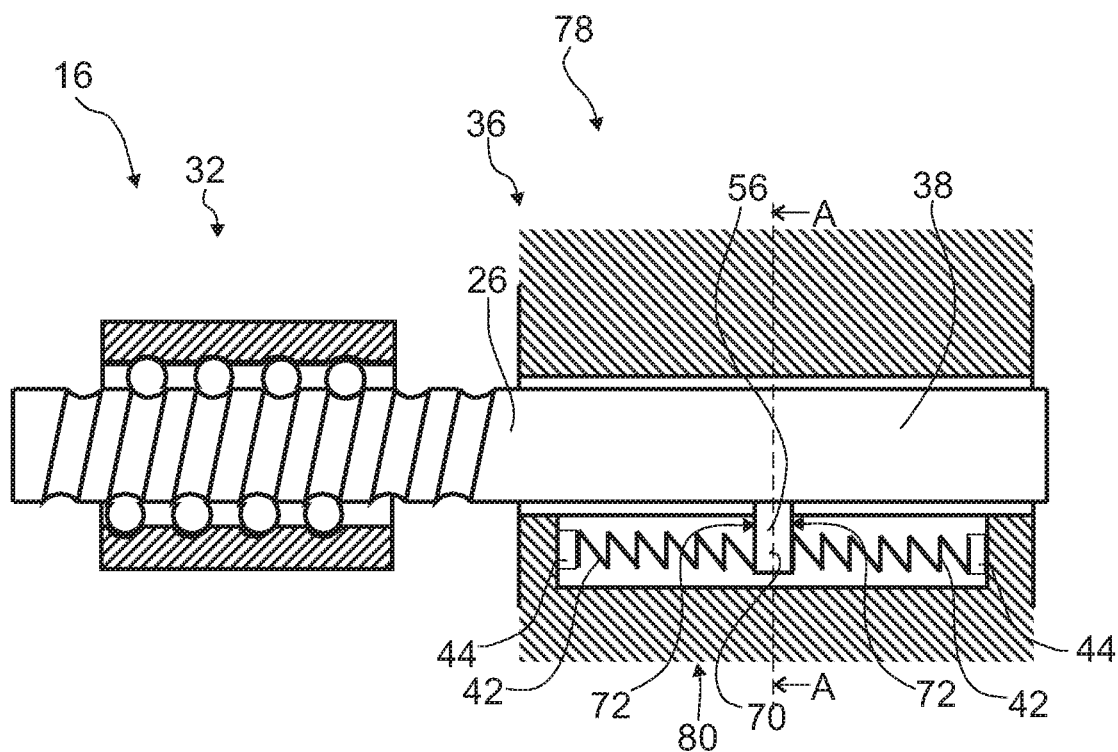
FIG. 4 shows a section through a rack subassembly according to the present disclosure, having a sensor unit according to the present disclosure.
Figure 5:
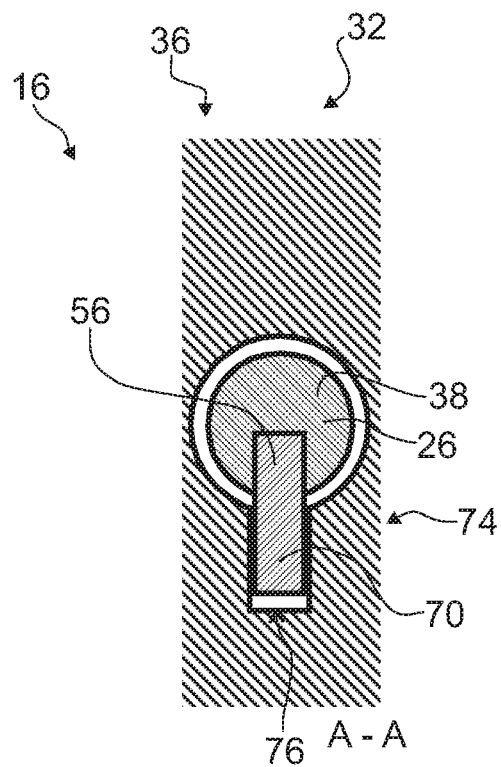
FIG. 5 shows another section through the rack subassembly from FIG. 4.

In FIGS. 4 and 5, the sensor unit 36 is shown in a different embodiment, which is provided in the rack subassembly 16 in the embodiment shown. Thus, the sensor unit 36 is designed as a rack sensor 32, wherein the rack 26 corresponds to the component 38 to be monitored by the sensor unit 36. In contrast to the sensor unit 36 according to the embodiment shown in FIGS. 2 and 3, the sensor unit 36 in the embodiment shown in FIGS. 4 and 5 comprises two spring elements 42, which are associated with opposite sides of a single moving member 56, as is clearly apparent from FIG. 4.

In the embodiment shown, the moving member 56 is arranged on a projection 70 of the component 38 to be monitored, i.e. the rack 26. Thus, the moving member 56 can be formed integrally with the component 38 to be monitored. Accordingly, the projection 70 forms two contact surfaces 72 for the respective second ends 48 of the spring elements 42, which, as already described above, interact via their respective first ends 46 with the associated piezoelectric sensor 44. In a manner analogous to the first embodiment, a movement of the rack 26 is detected by means of the two piezoelectric sensors 44 since a movement of the rack 26 leads to a movement of the moving member 56, i.e. of the projection 70, thereby causing a corresponding change in the forces applied to the two piezoelectric sensors 44, which leads to different voltage signals of the piezoelectric sensors 44.

From FIG. 5, it is clear, in particular, that the rack subassembly 16 comprises a rotation lock 74 since the projection 70 of the component 38 to be monitored, i.e. the rack 26, is guided in a recess 76 in the housing of the sensor unit 36, thereby preventing twisting of the rack 26. It is thus possible to dispense with a rack and pinion mechanism or some other anti-rotation safeguard in a steer-by-wire steering system 12 since the rotation lock 74 is implemented by means of the sensor unit 36 itself. Moreover, the rack subassembly 16 comprises a redundant absolute position detection unit 78, which is provided by the sensor unit 36.

In a manner analogous to the first embodiment, the absolute position detection unit 78 of redundant design is formed by the rack subassembly 16, in particular the front axle actuator 30, having a motor position sensor 71, which can automatically detect the relative position of the rack 26 via the position of the front axle actuator 30. Together with the absolute position measurement by the sensor unit 36, it is thereby possible to determine a very accurate absolute position of the steering shaft 26. The accuracy or resolution of the sensor unit 36 can be better than a functional safety limit of the rack subassembly 16, thereby allowing position measurement on the basis of the sensor unit 36 if the motor position sensor 71 fails. A corresponding fallback level (redundancy) is therefore created by means of the sensor unit 36, which accordingly ensures the absolute position detection unit 78 of redundant design.

It is furthermore possible in this way for the measurements of the motor position sensor 71 to be monitored or verified continuously in normal operation, and therefore redundancy is also provided in normal operation. Moreover, it is possible in general to provide a moisture or water penetration sensor 80, which is likewise formed by means of the sensor unit 36 for example, in particular the piezoelectric sensors 44, which serve as a transmitter and a receiver for ultrasound waves, e.g. ultrasound pulses.

One of the two piezoelectric sensors 44 emits an ultrasound pulse, which is received by the other piezoelectric sensor 44. If water has entered the housing of the sensor unit 36, correspondingly characteristic attenuation of the signal occurs. In particular, the piezoelectric sensors 44 or moisture or water penetration sensor 80 are arranged at a relatively low point in the housing of the sensor unit 36, in which the water would collect first.

Provision can also be made for a piezoelectric sensor 44 to be designed as a transmitter which emits an ultrasound pulse that is reflected, wherein the same piezoelectric sensor 44 receives and correspondingly evaluates the reflected ultrasound pulse in order to detect water in the housing of the sensor unit 36. In both embodiments, it is ensured that the respectively used sensor unit 36 converts a translational motion or rotary motion of the component 38 to be monitored, i.e. of the rack 26 or steering shaft 20, into a force or a pressure, which is detected by the multifunctional position sensor 40, in particular the at least one piezoelectric sensor 44.

It is thereby possible to achieve a high degree of integrity of the sensor unit 36 and thus of the absolute position detection with the components of the steering system 10 in a simple and low-cost manner.

What is claimed is:

1. A rack subassembly of a steering system, the rack subassembly comprising:
   a rack, and
   a multifunctional position sensor for sensing a position of the rack, the multifunctional position sensor having at least one spring element and at least one piezoelectric sensor, which is associated with the spring element and is provided at a first end of the spring element, wherein the spring element is associated with the rack via a second end opposite to the first end.

2. The rack subassembly as defined in claim 1, wherein a transmission arrangement is provided, which is associated with the at least one spring element, wherein the transmission arrangement is provided between the component to be monitored and the associated spring element.

3. The rack subassembly as defined in claim 1, wherein the multifunctional position sensor comprises two spring elements and two piezoelectric sensors, which are each associated with one spring element, in particular wherein the two spring elements are each preloaded.

4. The rack subassembly as defined in claim 3, wherein the spring elements are associated indirectly via the second ends thereof with the rack since a force transfer device is arranged in between.

5. The rack subassembly as defined in claim 4, wherein the force transfer device comprises a moving member is actuated.

6. The rack subassembly as defined in claim 5, wherein the two spring elements rest directly against the moving member via their respective second ends, in particular on opposite sides of the at least one moving member.

7. The rack subassembly as defined in claim 1, wherein the spring element rests directly, by means of its second end, against the component to be monitored, in particular against a contact surface provided on a projection of the component to be monitored.

8. The rack subassembly as defined in claim 1, wherein a moisture and/or water penetration sensor is provided.

9. The rack subassembly as defined in claim 1, wherein a steerable vehicle wheel is connected to an end of the rack.

10. The rack subassembly as defined in claim 1, wherein the steering system is a steer-by-wire steering system of a motor vehicle.

11. A steering wheel subassembly comprising:
    a steering wheel;
    a steering shaft; and
    a sensor unit having the steering shaft and a multifunctional position sensor for sensing a position of the steering shaft;
    wherein the multifunctional position sensor further comprises at least one spring element and at least one piezoelectric sensor, which is associated with the spring element and is provided at a first end of the spring element, wherein a second end of the spring element is connected to the steering shaft flexible line, the second end being opposite the first end.

12. The steering wheel subassembly as defined in claim 11, wherein a steering wheel actuator is provided which comprises a motor position sensor.

13. The steering wheel subassembly as defined in claim 11, wherein, by virtue, inter alia, of the sensor unit, the steering wheel subassembly comprises a redundant absolute position detection unit.

14. The steering wheel subassembly as defined in claim 11, wherein, by virtue of the sensor unit, the steering wheel subassembly has a failure feedback unit, which outputs a haptic feedback to the steering wheel in the case of failure of the steering wheel actuator.

15. The steering wheel subassembly as defined in claim 11, wherein the steering wheel subassembly comprises a self-centering unit for the steering wheel by virtue of the sensor unit.

16. The steering wheel subassembly as defined in claim 11, wherein, by virtue, inter alia, of the sensor unit, the steering wheel subassembly comprises a steering wheel lock, in particular wherein a radial extension, which is part of the steering wheel lock, is formed on the steering shaft.

17. The steering wheel subassembly as defined in claim 11, further comprising at least one moving member connecting the second end of the at least one spring element to the flexible line, the at least one moving member being connected to the steering shaft via the flexible line such that movement of the steering shaft responsively causes the at least one moving member to move.

18. A steering wheel subassembly of a steering system, the steering wheel subassembly comprising:
a steering wheel;
a steering shaft; and
a sensor unit for sensing a position of the steering shaft, the sensor unit including a first spring having a first end connected to a first piezoelectric sensor and a second end connected to a first moving member, and a second spring having a first end connected to a second piezoelectric sensor and a second end connected to a second moving member, the first and second moving members being connected to the steering shaft, rotation of the steering shaft causing the first and second moving members to move relative to one another.

19. The steering wheel subassembly as defined in claim 18, further comprising a flexible line wound about the steering shaft, a first end of the line being connected to the first moving member, a second end of the line being connected to the second moving member.

20. The steering wheel subassembly as defined in claim 18, wherein the steering system is a steer-by-wire steering system of a motor vehicle.

\* \* \* \* \*